Patented Mar. 11, 1941

2,234,554

UNITED STATES PATENT OFFICE 2,234,554

PROCESS OF RECOVERING VITAMINS

Harold W. Elley, Wilmington, Del., and James Waddell, Metuchen, N. J., assignors to E. I. du Pont de Nemours & Company, Wilmington, Del., a corporation of Delaware No Drawing. Application February 28, 1938, Serial No. 193,212

14 Claims. (Cl. 167—81)

This invention relates to the preparation of vitamins, more particularly it relates to the preparation of vitamin D from pure or crude provitamin D or natural materials containing the corresponding provitamin. The invention also relates to the stabilization of vitamin D.

In the manufacture of vitamin D from provitamin D by means of ultra-violet light it is usual to expose the provitamin to the activating source when dissolved in some suitable solvent. This is done in order to permit the light rays better to reach each of the molecules of the provitamin and so bring about an efficient activation. The choice of solvent depends on several factors, such as its solvent power for the provitamin used, its transmission of the ultra-violet light, its boiling point, the hazard connected with its use, etc. Solvents generally used are ethyl ether, various alcohols, e. g. methyl, ethyl and isopropyl, and hydrocarbons, e. g. hexane and benzene.

After the solution of provitamin has been activated it is necessary to concentrate the vitamin D into smaller volume and, in most cases, to transfer it into a vehicle more suitable for commercial handling than the organic solvent, such as an animal or vegetable oil. Further, it is necessary to separate unchanged provitamin from the irradiated solution so that it may be recovered for future use. In some cases it may be that the vitamin D is concentrated and obtained as pure crystals instead of being dissolved in some edible solvent. In any event the separation and concentration of the vitamin D is accomplished by distilling off the organic solvent either in whole or in part and separating the unchanged provitamin by crystallizing from the same or another solvent, the vitamin D remaining in the mother liquors. After thus separating the untransformed provitamin the remainder of the solvent may be distilled off in the presence of an oil thus transferring the vitamin to the latter medium.

Since vitamin D is an unstable substance it is subject to more or less destruction and loss during these operations. Even when great care is taken to protect the vitamin, such as distilling off the organic solvent under vacuum and avoiding exposure of the vitamin to heat and air as much as possible, appreciable losses still take place.

The nature and the degree of purity of the provitamin which is used has a great bearing on the manufacturing operations and on the amount of destruction of vitamin D encountered. It is now fully established that there are provitamins other than ergosterol and that, in particular, certain animal sterol fractions on activation yield vitamin D much more desirable for certain uses than activated ergosterol. In such animal extracts the provitamin is always present as a relatively small fraction of the total sterols, and there is no known economical method of separating it from the inactivatable sterols. Therefore, in irradiating such material it is necessary to expose the whole sterol mixture and later to separate the vitamin D formed from the large bulk of inactivatable sterols and whatever unchanged provitamin remains. It follows that with such mixtures larger volumes of solvent must be exposed per unit weight of provitamin and in the subsequent concentration operations more filtrations and more manipulations are necessary to separate the vitamin D than is the case when a pure provitamin is used. We have found that destruction of vitamin D is particularly severe in such cases. It may be that vitamin D originating from certain animal provitamins is more unstable than, for example, irradiated ergosterol but we prefer to explain the greater losses on the basis of the increased manipulation incident to the removal of the large bulk of inactivatable sterols.

This invention has for an object the preparation of vitamins in increased yields. A further object is the prevention of vitamin D loss during its recovery from plant and animal materials. A still further object is to stabilize vitamin D during its recovery from plant and animal materials. A still further object is to stabilize vitamin D during activation of pro-vitamin D containing materials and subsequent recovery operations. A still further object includes the incorporation of stabilizers which have no appreciable absorption for ultra-violet in vitamin yielding materials during activation thereof. Other objects include a general advance in the art. Still other objects will appear hereinafter.

The above objects may be accomplished by the following invention which comprises adding a stabilizer for vitamins which has substantially no absorption for ultra-violet light at some stage during the recovery of vitamins from raw materials. The stabilizer added should also prevent the formation of peroxides during the irradiation, extraction or distillation steps which are used in the recovery of vitamin D from natural materials containing the same. In its preferred embodiment they are accomplished by incorporating a sugar amine compound in a vitamin D yielding material before activation and then recovering the vitamin in the usual manner.

By a sugar amine is meant an amine of a reducing sugar having a carbon chain of at least five carbon atoms. The amines may be employed as the free bases or as the salts of aliphatic acids.

The free bases may be represented by the formula:

wherein R represents a carbon atom of a sugar nucleus containing a carbon chain of at least five carbon atoms and each of $R_1$ and $R_2$ represents hydrogen or a carbon atom of an organic group. The sugar amines may also be defined as amino alcohols in which the alcohol radical is a normal open-chain radical containing at least five carbon atoms and having a hydroxyl group attached to each carbon other than the one attached to the nitrogen. The sugar amines may be employed as their aliphatic ethers or esters, that is, the hydrogens of one or more of the OH groups may be replaced by alkyl, hydroxy alkyl or acyl radicals, such as ethyl, hydroxy ethyl or acetyl radicals. However, such ether and ester type compounds are generally less effective and hence are less desirable.

Some of the simple primary sugar amines are known and the methods of preparing them are also known. Some of the simple secondary and tertiary amines and the methods of preparing them are known. Some of the secondary and tertiary amines and methods for preparing them are disclosed in P. L. Salzberg and R. B. Flint, U. S. Patents 2,016,962, 1,994,467 and 2,016,963, respectively.

The invention will be further understood but is not intended to be limited by the following examples:

Example I

To 105 gm. of cholesterol containing about 0.15 per cent provitamin was added 105 mg. methyl glucamine and the mixture dissolved in warm ethyl alcohol. This solution was irradiated with ultra-violet light under conditions known to produce good activation. It was then refrigerated and the precipitated sterol filtered off and washed. To the filtrate (and washings) was then added an additional 210 mg. of methyl glucamine and it was now subjected to distillation under reduced pressure. From time to time during this concentration step distillation was stopped and the solution was refrigerated and then filtered to remove the cholesterol which had been in solution in the alcohol. Finally a vegetable oil was added and the last of the alcohol distilled away. The oil concentrate, so obtained, was found to possess much more vitamin D as determined by rat tests than similar preparations made without a stabilizer.

Example II

To 315 gm. of the sterol mixture isolated from mussels (Mytilus edulis), containing about 10.5 per cent provitamin, was added 0.33 gm. methyl glucamine (1% of the total provitamin) and these were dissolved in warm isopropyl alcohol. The solution was then irradiated with ultra-violet light till good activation had taken place. A small sample of the irradiated solution was taken for biological assay and the remainder was then concentrated by vacuum distillation. The sterols, precipitating out as the volume became smaller, were filtered off and finally, as in Example I, an oil concentrate of the vitamin D was obtained. This concentrate was then assayed on rachitic rats and the amount of vitamin D present was found to be approximately 87 per cent of what was calculated to be present in the unconcentrated alcohol solution. Previous experiments in which no stabilizer was used showed a recovery of much less of the vitamin, the losses in many cases amounting to 50 per cent.

In place of the methyl glucamine of the preceding examples, other sugar amines may be substituted. As examples of useful sugar amines which may be mentioned are:

I. Primary amines

| | |
|---|---|
| Glucamine | Mannamine |
| Fructamine | Rhamnamine |
| Xylamine | Galactamine |
| Ribamine | Sorbinamine |
| Lyxamine | Sorbamine |
| Lactamine | Gulamine |
| Arabinamine | Talamine |

II. Secondary amines

| | |
|---|---|
| Methyl glucamine | Amyl glucamine |
| Ethyl glucamine | Methyl xylamine |
| Isopropyl glucamine | Butyl xylamine |
| N-butyl glucamine | Ethyl galactamine |
| Isobutyl glucamine | Methyl mannamine |
| Octyl glucamine | Amyl arabinamine |
| Dodecyl glucamine | Diglucamine |
| Cyclohexyl glucamine | Dixylamine |
| Cyclohexanol glucamine | Difructamine |
| Hydroxypropyl glucamine | Reaction product of glucamine and xylose |

III. Tertiary amines

| | |
|---|---|
| Dimethyl glucamine | Octyl methyl glucamine |
| Difurfuryl glucamine | Didodecyl xylamine |
| Dimethyl fructamine | |
| Dodecyl methyl glucamine | |

IV. Salts

| | |
|---|---|
| Glucamine stearate | Methyl glucamine oleate |
| Glucamine oleate | Xylamine stearate |

As has been pointed out heretofore, our amines may be employed as the free bases or as the salts of aliphatic acids and particularly of the long chain or fatty acids. Among the fatty acids which may be employed to form the salts of these amine bases may be mentioned:

| | |
|---|---|
| Lauric acid | Linolic acid |
| Hydroxy stearic acid | Linolenic acid |
| Coconut oil acids | Linseed oil acids |
| Elaidic acid | Behenic acid |
| Erucic acid | Behenolic acid |
| Brassidic acid | Ricinoleic acid |
| China-wood oil acids | Castor oil acids |
| Oleostearic acid | Abietic acid and the like |
| Stearolic acid | |

Some of the free amines of our invention are oil and fat soluble and substantially insoluble in water.

This invention, however, is not to be limited to the sugar amine compounds described above, which represent the preferred embodiment hereof, but other stabilizers which are stable under the influence of ultra-violet light and do not substantially absorb the same may be used. The stabilizers useful according to this invention should prevent the formation of peroxides. A rapid method of testing the efficacy of a stabilizer suitable for the present purposes is as follows. A solution of provitamin either pure or mixed with other sterols, in any chosen solvent, e. g. ethyl alcohol, isopropyl alcohol, is exposed in a quartz flask to ultra-violet light in the presence of a small amount of air. If the stabilizer does not substantially absorb the ultra-violet light in the amount used, is not decomposed thereby, and prevents the formation of peroxides, it may be considered as being useful in accordance with the present invention. Any of the well known peroxide tests may be used to establish the non-formation of peroxides.

The amount of stabilizer used may vary considerably, the exact amount depending somewhat on the particular solvent used, the kind of provitamin treated, etc. We have found that an amount of stabilizer in the order of 0.1 to 0.2% by weight of the total sterol to be activated is effective in protecting the vitamin D during the procedural steps of recovering the latter.

While we prefer to add the stabilizer before activation, it is possible to secure good results by first activating and then adding the stabilizer before starting the other manufacturing steps. Such a procedure is advantageous if the stabilizer has a significant absorption in the ultra violet region of the spectrum and interferes with the activation of the provitamin.

We are aware of the fact that antioxidants have been added to oils, fats and foodstuffs containing vitamins. We are also aware of the fact that hydroquinone has been added to oils containing certain vitamins, but that compound is distinct from those used in carrying out the present invention. The compounds of this invention are furthermore superior to hydroquinone. As a result of our investigations we have found that once vitamin D is in solution in an animal or vegetable oil it is remarkably stable.

This invention possesses the advantage that a significant increase in yield of vitamin D over prior art processes can be quickly and economically made. A further advantage resides in the fact that the stabilizers are relatively non-toxic and may be retained in the final concentrates. The stabilizers are compatible with the various plant and animal oils such as corn oil, cottonseed oil, peanut oil, lard, and fish oils, e. g. cod liver oil and the like, in which the vitamins are usually dissolved and marketed. The stabilizers furthermore, prevent deterioration, rancidity and discoloration of the above oils so that it is not necessary to add additional oil stabilizers.

While the form of the present invention as herein disclosed constitutes a preferred form, it is to be understood that other forms may be adopted without departing from the spirit and substance of the broad invention, the scope of which is commensurate with the appended claims.

We claim:

1. In a process of recovering a vitamin from materials containing a provitamin involving activation, extraction and distillation steps, the improvement which comprises adding a stabilizer which comprises a compound taken from the class consisting of sugar amines and aliphatic acid salts thereof which stabilizer does not decompose in the presence of ultra-violet light and does not substantially absorb the same prior to the final distillation step.

2. In a process of recovering vitamin D from materials containing provitamin D involving activation, extraction and distillation steps, the improvement which comprises adding a non-toxic stabilizer which comprises a compound taken from the class consisting of sugar amines and aliphatic acid salts thereof which stabilizer does not decompose in the presence of ultra-violet light, does not substantially absorb the same, and prevents the formation of peroxides at a stage of the process prior to the final distillation step.

3. In a process of recovering vitamin D from materials containing provitamin D involving activation, extraction and distillation steps in which said materials are incorporated in a solvent, the improvement which comprises adding a sugar amine to the solvent prior to the final distillation step.

4. In a process of recovering vitamin D from animal materials containing provitamin D involving exposure to ultra-violet light in an organic solvent, extraction and distillation steps the improvement which comprises adding a sugar amine to the solvent prior to the final distillation step.

5. In a process of recovering vitamin D from animal materials containing provitamin D involving exposure to ultra-violet light in an organic solvent, extraction and distillation steps, the improvement which comprises adding a compound taken from the class consisting of sugar amines and aliphatic acid salts thereof in which the sugar radical contains at least 5 carbon atoms, one carbon atom being singly bonded to the amino nitrogen and to carbon and hydrogen solely prior to the final distillation step.

6. In a process of recovering vitamin D from materials containing provitamin D involving activation, extraction and distillation steps in which said materials are incorporated in a solvent, the improvement which comprises adding a sugar amine to the solvent prior to the final distillation step, in an amount sufficient to inhibit deterioration of the vitamin D.

7. The process which comprises dissolving a provitamin D containing material in an organic solvent adding a sugar amine thereto, exposing the solution to ultra violet light and recovering a vitamin D concentrate therefrom.

8. The process which comprises dissolving a provitamin D containing material in an organic solvent adding a sugar amine in which the sugar radical contains at least 5 carbon atoms, one carbon atom being singly bonded to the amino nitrogen and to carbon and hydrogen solely thereto, exposing the solution to ultra violet light and recovering a vitamin D concentrate therefrom.

9. The process which comprises dissolving a sterol in an organic solvent, adding a small amount of a compound taken from the class consisting of alkyl glucamines and the fatty acid salts thereof to the solution, subjecting the solution to a source of ultra-violet light and extracting a vitamin D concentrate therefrom.

10. The process which comprises dissolving a provitamin D containing material in an organic solvent adding a long chain fatty acid salt of a sugar amine in which the sugar radical contains at least 5 carbon atoms, one carbon atom being singly bonded to the amino nitrogen and to carbon and hydrogen solely thereto, exposing the solution to ultra violet light and recovering a vitamin D concentrate therefrom.

11. An improved process as set forth in claim 6, wherein said sugar amine is a methyl glucamine.

12. An improved process as set forth in claim 6 wherein said sugar amine is dodecyl glucamine.

13. An improved process as set forth in claim 6, wherein said sugar amine is glucamine stearate.

14. A process as set forth in claim 8 wherein said sugar amine is methyl glucamine.

HAROLD W. ELLEY.
JAMES WADDELL.